United States Patent
Seo

(10) Patent No.: US 6,456,368 B2
(45) Date of Patent: *Sep. 24, 2002

(54) THREE-DIMENSIONAL IMAGE CAPTURING DEVICE

(75) Inventor: Shuzo Seo, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/843,839

(22) Filed: Apr. 30, 2001

(30) Foreign Application Priority Data

May 2, 2000 (JP) ........................................ 2000-133504

(51) Int. Cl.[7] ................................................. G01C 3/08
(52) U.S. Cl. ..................................... 356/5.01; 356/5.09
(58) Field of Search ............................... 356/5.09, 5.01, 356/5.15

(56) References Cited

U.S. PATENT DOCUMENTS

| | | | | |
|---|---|---|---|---|
| 3,611,182 A | * | 10/1971 | Treacy ....................... | 331/94.5 |
| 4,125,835 A | * | 11/1978 | Barry .......................... | 343/13 |
| 4,666,295 A | * | 5/1987 | Duvall, III et al. ............. | 356/5 |
| 4,725,841 A | * | 2/1988 | Nysen et al. .................. | 342/44 |
| 4,928,152 A | * | 5/1990 | Gerardin ....................... | 356/5 |
| 5,179,286 A | * | 1/1993 | Akasu ......................... | 280/561 |
| 5,262,836 A | * | 11/1993 | Nourrcier ...................... | 356/5 |
| 5,267,016 A | * | 11/1993 | Meinzer et al. ............. | 356/358 |
| 5,519,209 A | * | 5/1996 | Rapoport et al. ........... | 250/214 |
| 5,767,953 A | * | 6/1998 | McEwan .................... | 356/5.01 |
| 5,949,530 A | * | 9/1999 | Wetteborn .................. | 356/5.01 |
| 6,088,058 A | * | 7/2000 | Mead et al. ................. | 348/296 |
| 6,108,071 A | * | 8/2000 | Landry et al. ............. | 356/5.05 |
| 6,259,478 B1 | * | 7/2001 | Hori ........................... | 348/296 |
| 6,323,942 B1 | * | 11/2001 | Bamji ........................ | 356/5.01 |

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

A three-dimensional image capturing device performs sensing operations of a first reflected light beam component and a second reflected light beam component. In the sensing operation of the first reflected light beam component, the pulse shape of a distance measuring light beam is triangular. The electric charge accumulating period starts at the same time as the disappearance of a pulse of the distance measuring light beam, and ends after the disappearance of a pulse of the reflected light beam. In the sensing operation of the second reflected light beam component, the pulse shape of a correction light beam is rectangular. The electric charge accumulating period starts at the same time as the disappearance of a pulse of the correction light beam, and ends after the disappearance of a pulse of the reflected light beam. A signal charge obtained by the first reflected light beam component sensing operation is divided by a signal charge obtained by the second reflected light beam component sensing operation.

4 Claims, 11 Drawing Sheets

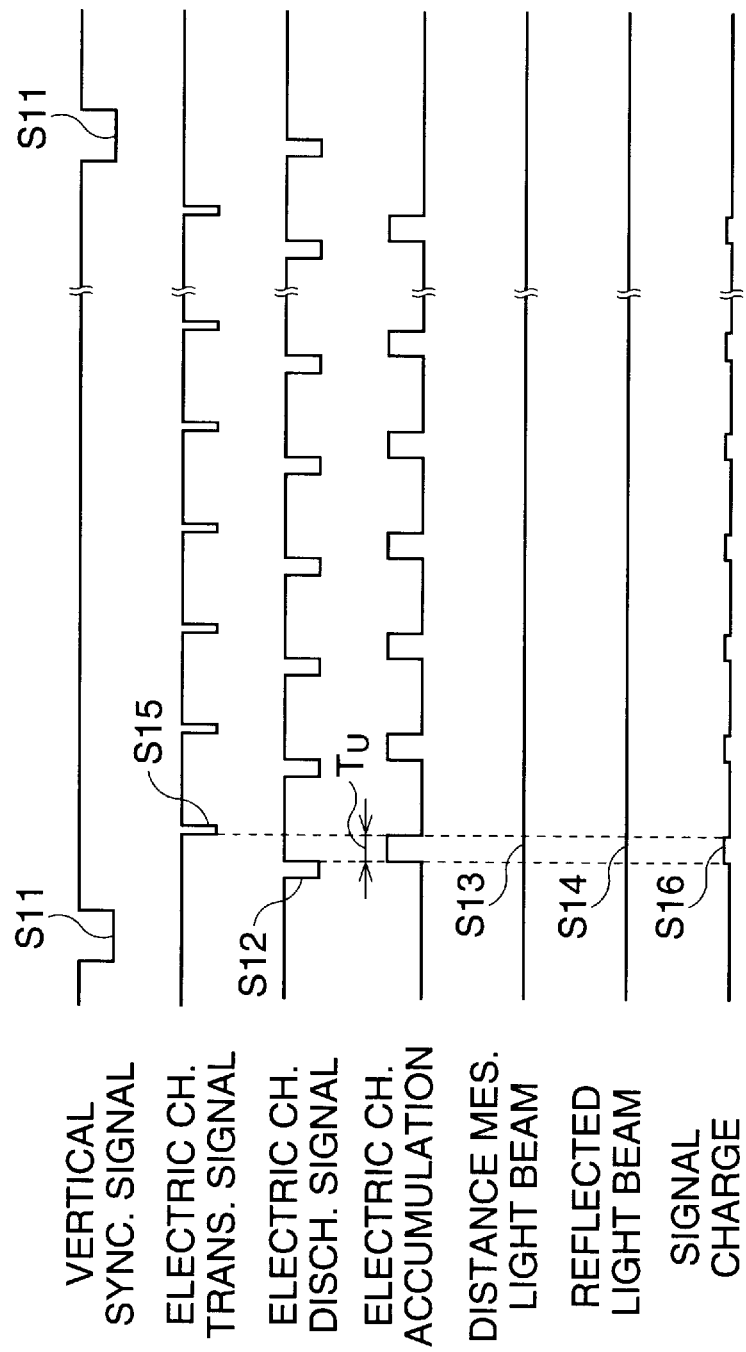

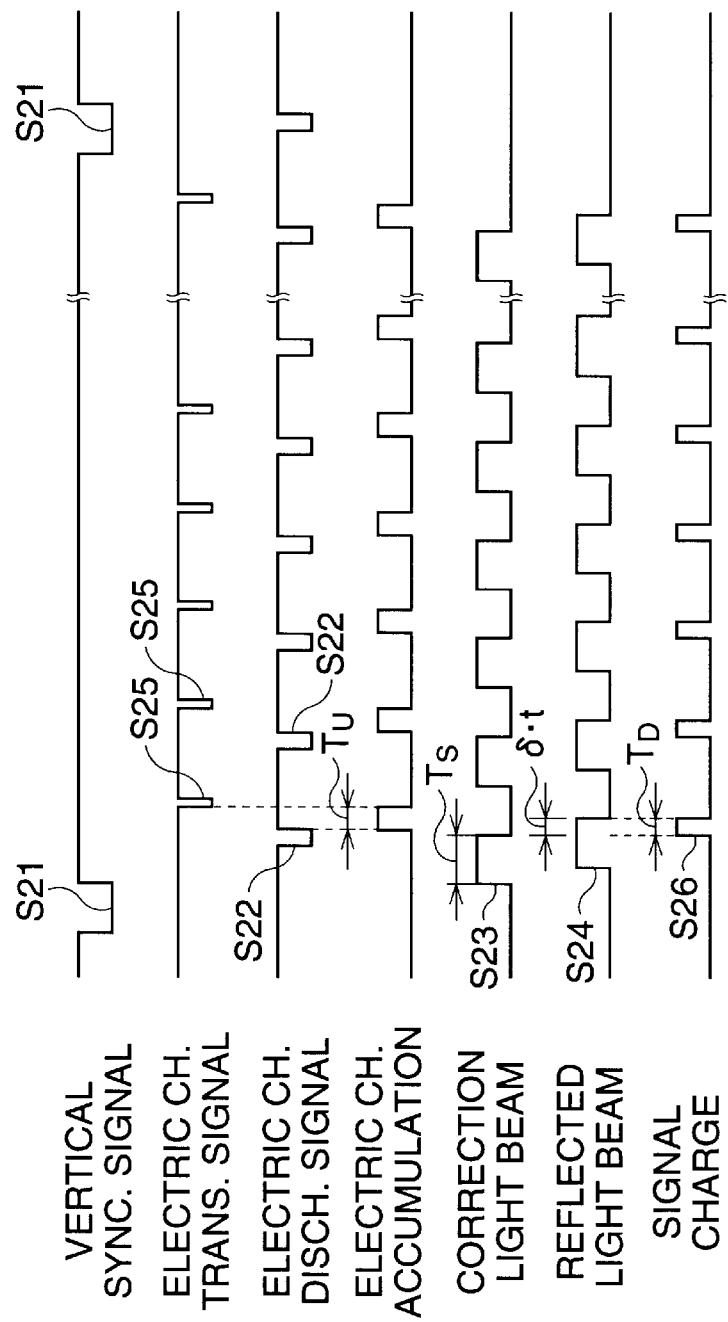

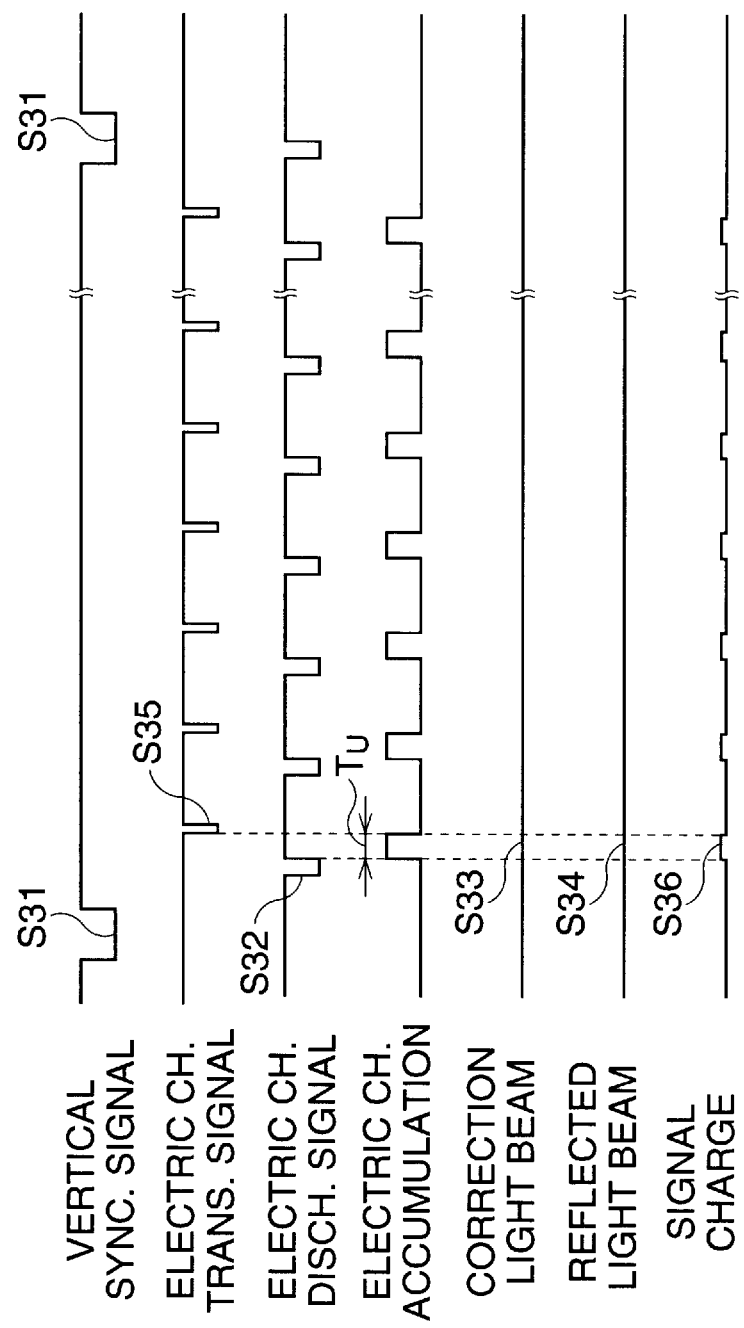

[SENSING OPER. OF FIRST REFLECTED LIGHT BEAM COMP.]

[SENSING OPER. OF SECOND REFLECTED LIGHT BEAM COMP.]

THREE-DIMENSIONAL IMAGE CAPTURING DEVICE

BACKGROUND OF THE INVENTION

1. Field of the Invention

The present invention relates to a three-dimensional image capturing device by which a three-dimensional shape of a measurement subject, which is to be measured, is captured by a time-of-flight measurement.

2. Description of the Related Art

Conventionally, there is known a three-dimensional image capturing device, in which distance measuring light beam pulses are radiated onto a measurement subject for a constant period and the reflected light beam pulses coming from the measurement subject are received and integrated by an imaging device such as a CCD. Namely, each photodiode of the CCD corresponds to each point on the surface of the measurement subject, and thus electric charge corresponding to the point is accumulated in the photodiode. Due to this, the shape of the surface of the measurement subject S is sensed.

In a conventional three-dimensional image capturing device as described above, if the device is constructed in such a manner that information, which is used for correcting a reflectance to improve the accuracy of the distance measurement, is sensed, it may be necessary to expand the output range of the imaging device, such as the CCD. However, merely expanding the output range of the imaging device will cause further difficulties in sufficiently improving the accuracy of the distance measurement.

SUMMARY OF THE INVENTION

Therefore, an object of the present invention is to improve the accuracy of the distance measurement, when sensing a three-dimensional shape of a measurement subject, without substantially expanding the output range of the imaging device.

According to the present invention, there is provided a three-dimensional image capturing device, comprising a distance measuring light beam irradiating processor, a first reflected light beam component sensing processor, a correction light beam irradiating processor, a second reflected light beam component sensing processor and a distance information calculating processor.

The distance measuring light beam irradiating processor irradiates a distance measuring light beam to a measurement subject. The distance measuring light beam is a pulsed beam. The height of the pulse changes with time. The measurement subject reflects the distance measuring light beam to generate a first reflected light beam pulse. The first reflected light beam component sensing processor receives the first reflected light beam pulse for a first sensing period to sense a first reflected light beam component. The correction light beam irradiating processor irradiates a correction light beam to the measurement subject. The correction light beam is a pulsed beam. The height of the pulse is constant. The measurement subject reflects the correction light beam to generate a second reflected light beam pulse. The second reflected light beam component sensing processor receives the second reflected light beam pulse for a second sensing period to sense a second reflected light beam component. The distance information calculating processor divides the first reflected light beam component by the second reflected light beam component to obtain the distance from the device to each point of the surface of the measurement subject.

BRIEF DESCRIPTION OF THE DRAWINGS

The objects and advantages of the present invention will be better understood from the following description, with reference to the accompanying drawings in which:

FIG. 6 is a timing chart of a sensing operation of a first noise component;

FIG. 7 is a timing chart of a sensing operation of a second reflected light beam component;

FIG. 8 is a timing chart of a sensing operation of a second noise component;

DESCRIPTION OF THE PREFERRED EMBODIMENTS

Figure 1:
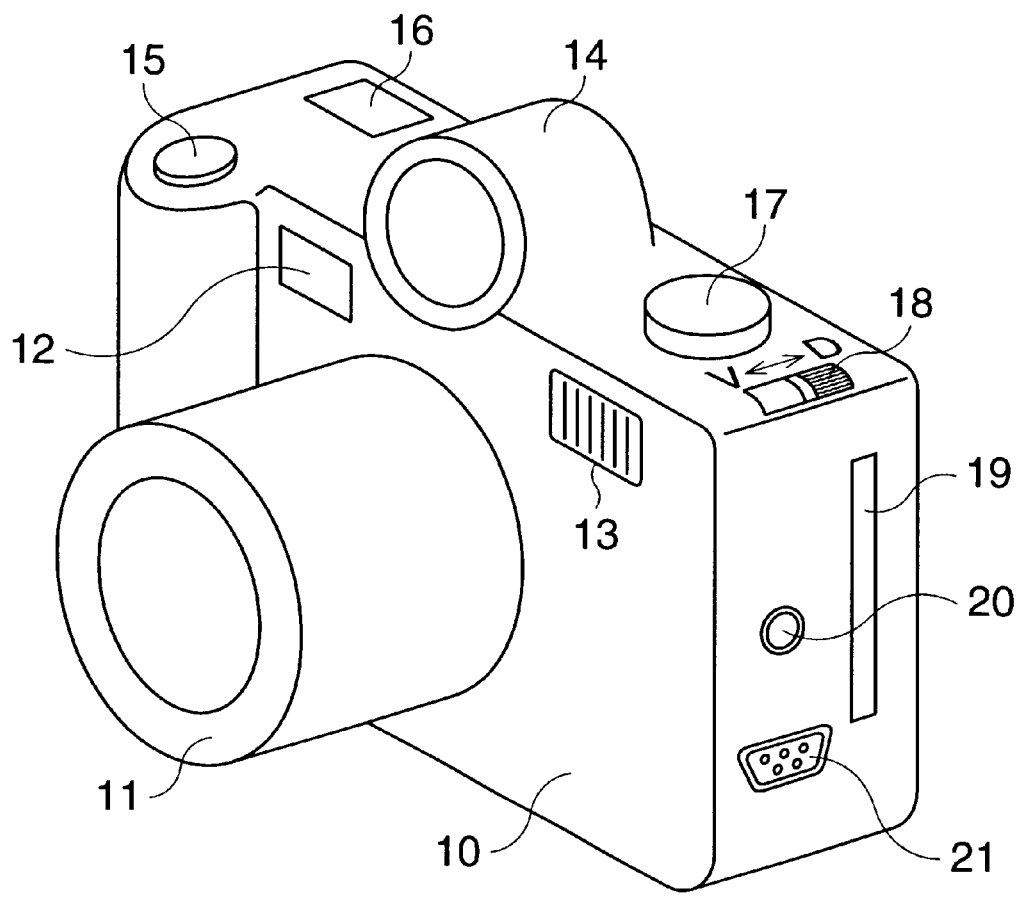
FIG. 1 is a perspective view showing a camera provided with a three-dimensional image capturing device of an embodiment of the present invention.

The present invention will be described below with reference to the embodiments shown in the drawings.

FIG. 1 is an external view of a camera having a three-dimensional image capturing device of an embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed into which a recording medium, such as an IC memory card, is insertable, and a video output terminal 20 and an interface connector 21 are also provided.

Figure 2:
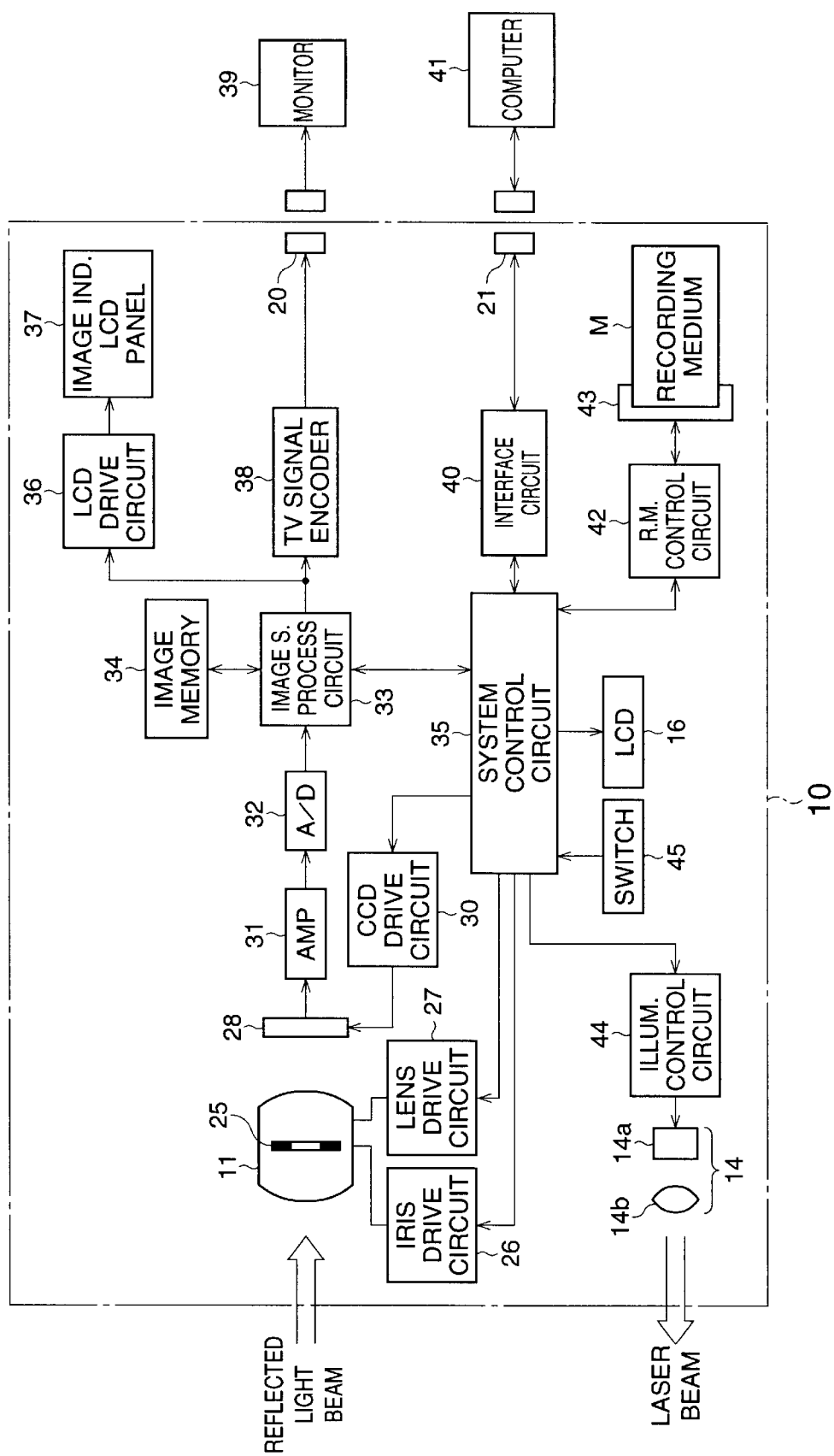
FIG. 2 is a block diagram showing an electrical construction of the camera shown in FIG. 1.

FIG. 2 is a block diagram showing an electrical construction of the camera shown in FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through a video output terminal 20. The system control circuit 35 is connected to an interface circuit 40, which in turn is connected to an interface connector 21. Therefore, the digital image data read from the image memory 34 can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

An illumination control circuit 44 is connected to the system control circuit 35. The light emitting device 14 is provided with a luminous-flux emitting element 14a and an illumination lens 14b, and an operation of the luminous-flux emitting element 14a is controlled by the illumination control circuit 44. The luminous-flux emitting element 14a radiates a pulsed laser beam, which is a distance measuring light beam, and which irradiates a whole of a measurement subject through the illumination lens 14b. The pulse shape of the laser beam is rectangular or triangular, as described later. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later. Note that, in the sensing operation of the three-dimensional image, a control of a transferring operation and so on, in the CCD 28, is performed by the system control circuit 35 and the CCD drive circuit 30.

The liquid crystal display panel 16 and a switch group 45, including the release switch 15, the mode change dial 17 and the V/D mode switch 18, are connected to the system control circuit 35.

Figure 3:
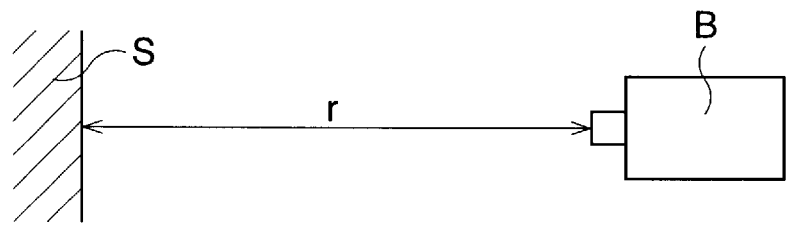
FIG. 3 is a view showing a principle behind a distance measurement.
Figure 4:
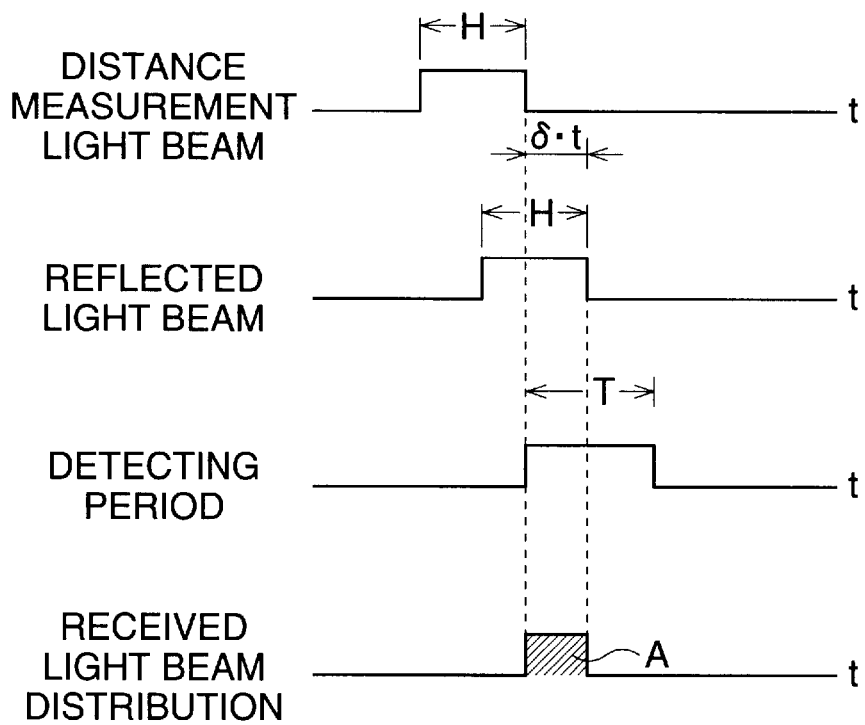
FIG. 4 is a timing chart showing a distance measuring light beam, a reflected light beam, a gate pulse and a distribution of an amount of a light beam received by a CCD.

With reference to FIGS. 3 and 4, a principle behind a distance measurement in the embodiment is described below. Note that, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similar to the distance measuring light beam. The fall of the pulse of the reflected light beam occurs after the fall of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C / 2$$

wherein "C" is the velocity of light.

For example, by setting a condition in such a manner that the reflected light beam can only be sensed from a fall of the pulse of the distance measuring light beam to a point after a fall of the pulse of the reflected light beam so as to sense a component containing the fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the greater the received light amount A.

In this embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
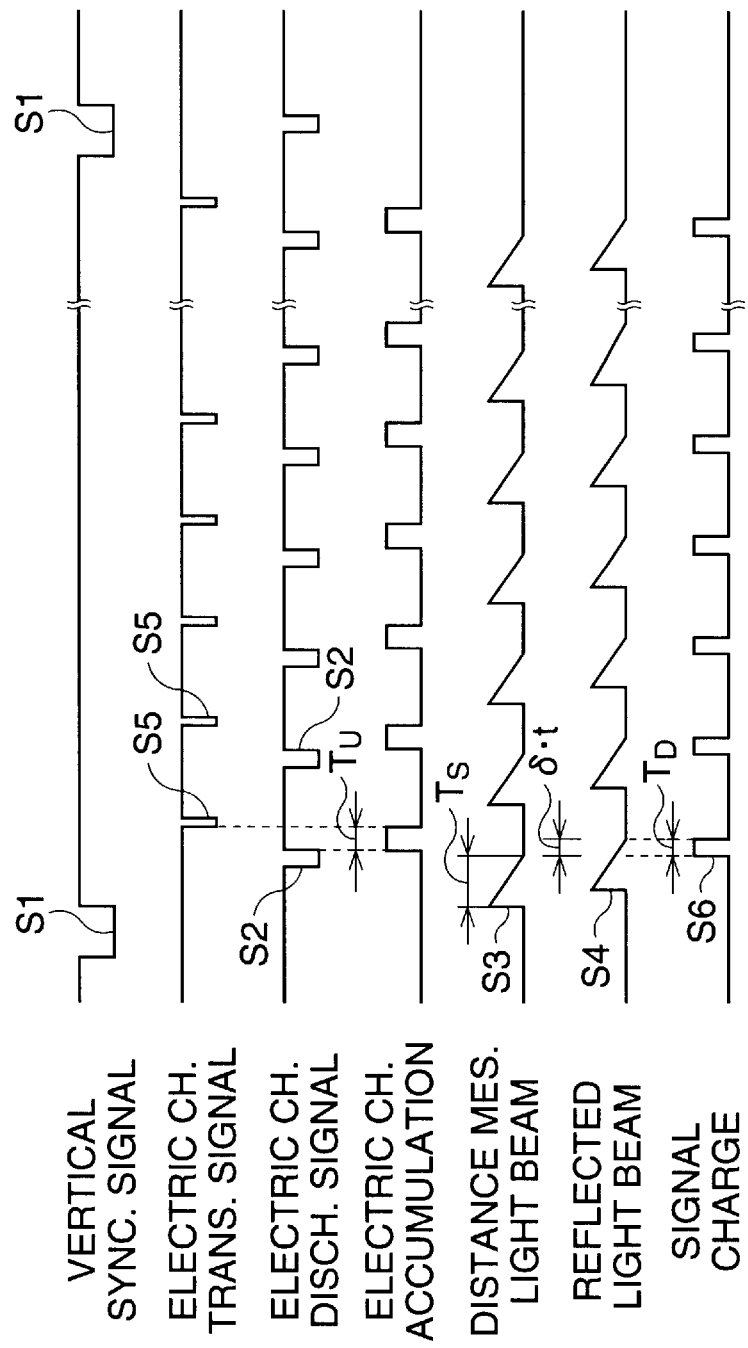
FIG. 5 is a timing chart of a sensing operation of a first reflected light beam component.

FIG. 5 is a timing chart of a sensing operation of a first reflected light beam component, by which data, corresponding to the distance from the camera body 10 to each point on a surface of the measurement subject, is sensed. The sensing operation of the first reflected light beam component is described below with reference to FIGS. 1, 2 and 5. Note that, in FIG. 4, although the pulse shapes of the distance measuring light beam and the reflected light beam are rectangular for the simplicity of the explanation, the actual pulse shapes are triangular, or saw toothed, as shown in FIG. 5.

In synchronization with an output of a vertical synchronizing signal S1, the light emitting device 14 is actuated, and thus a distance measuring light beam S3, which is a triangular pulsed beam, is output therefrom. The distance measuring light beam S3 has a constant pulse width and rises vertically from the time-axis and linearly decreases to zero for the duration of the pulse. The distance measuring light beam S3 is reflected by the measurement subject, and enters the CCD 28 as a reflected light beam S4. The pulse shape of the reflected light beam S4 is triangular, similar to the distance measuring light beam S3.

An electric charge discharging signal (a pulse signal) S2 is output in synchronization with the time at which each of the distance measuring light beams S3 disappears. The output of the electric charge discharging signal S2 is controlled to terminate at the same time the pulse of the distance measuring light beam S3 disappears. Due to this, unwanted charge accumulated in the photo-diodes is discharged to the substrate. When a predetermined time has elapsed since the output of the distance measuring light beam S3, an electric charge transfer signal (pulse signal) S5 is output, so that the electric charge accumulated in the photo-diodes is transferred to the vertical transfer unit. Note that the electric charge transfer signal S5 is output after the pulse of the reflected light beam S4 disappears.

Thus, for a period $T_U$ from the end of the output of the electric charge discharging signal S2 to the beginning of the output of the electric charge transfer signal S5, a signal charge corresponding to the distance from the camera body 10 to the measurement subject is accumulated in each of the photo-diodes. Namely, the electric charge accumulating period $T_U$ is started at the same time as a period $T_S$ ends, for which the distance measuring light beam S3 is output, and during the electric charge accumulating period $T_U$ (i.e., a first sensing period), only a part of the reflected light beam S4, which is a first reflected light beam component including a part in which the pulse height of the reflected light beam S4 is relatively low, is detected by the CCD 28. A signal charge S6, generated by the detected light beam, corresponds to the distance from the camera body 10 to the measurement subject. In other words, the signal charge S6, corresponding to a light beam, which is included in the reflected light beam S4 coming from the measurement subject and reaches the photo-diodes within the electric charge accumulation period $T_U$, is accumulated in the photo-diodes. The signal charge S6 is transferred to the vertical transfer unit by the electric charge transfer signal S5.

After a predetermined time has elapsed since the output of the electric charge transfer signal S5, the electric charge discharging signal S2 is again output, so that unwanted charge, which is accumulated in the photo-diodes after the transfer of the signal charge S6 to the vertical transfer unit, is discharged to the substrate. Thus, another charge, due to the next distance measuring light, is accumulated in the photo-diodes. Then, similar to the above description, when the electric charge accumulation period $T_U$ has again elapsed, the signal charge S6 is transferred to the vertical transfer unit.

The transferring operation of the signal charge S6 to the vertical transfer unit is repeatedly performed until the next vertical synchronizing signal S1 is output. Thus, the signal charge S6 is integrated in the vertical transfer unit. The signal charge S6 integrated for one field period, which is between two vertical synchronizing signals S1, corresponds to distance information of the measurement subject, on condition that the measurement subject is stationary for the period between the two vertical synchronizing signals S1.

The detecting operation of the signal charge S6 described above is carried out in all of the photo-diodes provided in the CCD 28. As a result of the detecting operation for one field period, the distance information sensed by each of the photo-diodes is held in a corresponding part of the vertical transfer unit, which is located adjacent to the column of photo-diodes. The distance information is output from the CCD 28 by a vertical transferring operation of the vertical transfer units and a horizontal transferring operation of a horizontal transfer unit (not shown). The distance information is then output from the three-dimensional image capturing device, as a three-dimensional image data of the measured subject.

The reflected light beam, sensed by the CCD 28 as described above, maybe affected by a reflectance of the surface of the measurement subject. Therefore, the distance information, obtained through the reflected light beam, may contain an error resulting from the reflectance. Further, the reflected light beam sensed by the CCD 28 may contain a noise component, such as ambient daylight, being other than the reflected light beam from the measurement subject, which can cause an error. Accordingly, in the distance information sensing operation, it is preferable that influences of the reflectance of the surface of the measurement subject, the ambient daylight and so on, are corrected. A distance information sensing operation, in which the correction is performed, is described below.

Figure 9A:
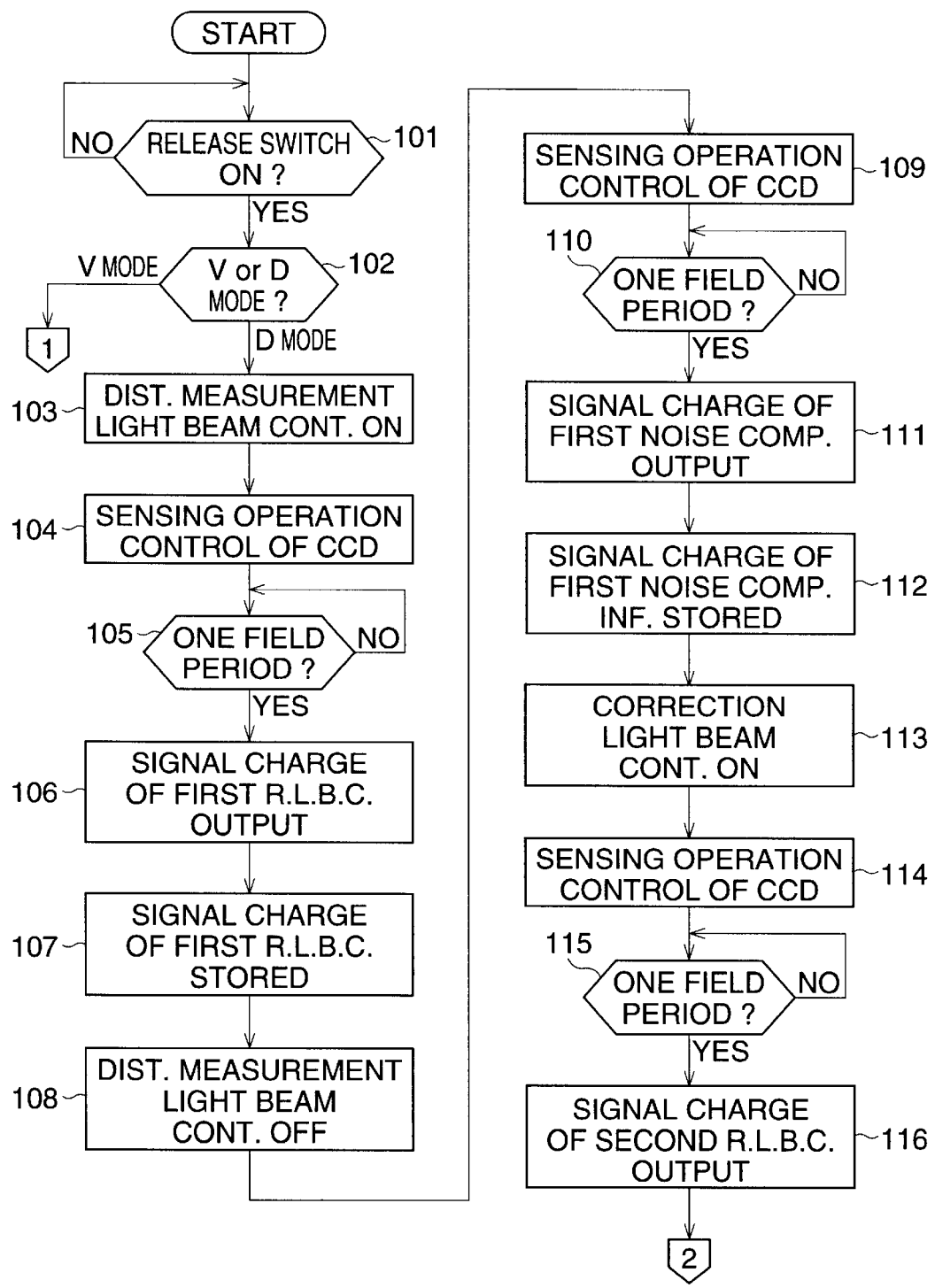
FIGS. 9A and 9B show a flowchart of a distance information sensing operation.
Figure 9B:
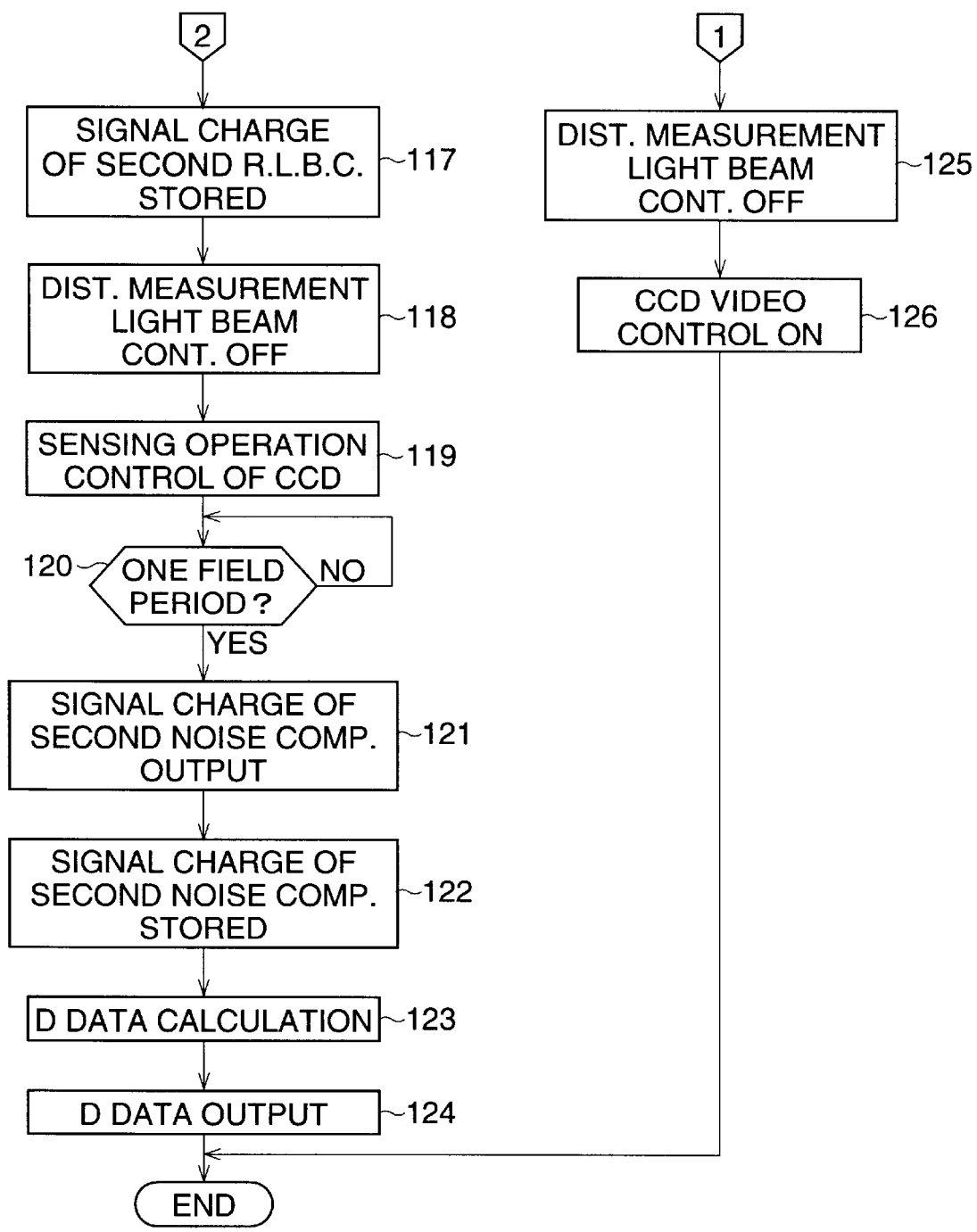

FIGS. 6, 7 and 8 show sensing operations of a first noise component, a second reflected light beam component and a second noise component, respectively. FIGS. 9A and 9B show a flowchart of the distance information sensing operation. With reference to FIGS. 1, 2, 5, 6, 7, 8, 9A and 9B, the distance information sensing operation, in which influences of the reflectance of the surface of the measurement subject, noise and so on, are corrected, is described.

When it is recognized in Step 101 that the release switch is fully depressed, Step 102 is executed in which it is determined which mode is selected, a video (V) mode or a distance measurement (D) mode. A change between the modes is carried out by operating the V/D mode switch 18.

When the D mode is selected, in Steps 103 through 107, the sensing operation of the first reflected light beam component is performed. In Step 103, the vertical synchronizing signal S1 is output and a distance measuring light beam control is started. Namely, the light emitting device 14 is driven so that the distance measuring light beam S3 is intermittingly output as a triangular pulsed beam. Then, Step 104 is executed so that a sensing operation control of the CCD 28 is started. Namely, the sensing operation of the first reflected light beam component, described with reference to FIG. 5, is started, and thus the electric charge discharging signal S2 and the electric charge transfer signal S5 are alternately output, so that the signal charge S6 of the first reflected light beam component is integrated in the vertical transfer unit.

In Step 105, it is determined whether one field period has elapsed since the beginning of the sensing operation of the first reflected light beam component, i.e., whether a new vertical synchronizing signal S1 has been output. When one field period has passed, the process goes to Step 106 in which the signal charge S6 of the first reflected light beam component is output from the CCD 28. The signal charge S6 is then stored in the image memory 34 in Step 107. Then, in Step 108, the distance measuring light beam control is turned OFF, and thus the light emitting operation of the light emitting device 14 is stopped.

In Steps 109 through 112, the sensing operation of the first noise component is performed. In Step 109, as shown in FIG. 6, the vertical synchronizing signal S11 is output, and a sensing operation control of the CCD 28 is started. Namely, an electric charge discharging signal S12 and an electric charge transfer signal S15 are alternately output while the light emitting operation of the light emitting device 14 is not carried out, i.e., while the light source is not illuminated. Although the electric charge accumulation period $T_u$ is the same as that of the sensing operation of the first reflected light beam component, which is shown in FIG. 5, the distance measuring light beam does not irradiate the measurement subject (reference S13), and thus there is no reflected light beam (reference S14). Therefore, although a signal charge of the first reflected light beam component is not generated, a signal charge S16 corresponding to an interference or noise component is generated, since a noise component, such as ambient daylight, etc., enters the CCD 28. Namely, the signal charge S16 corresponds to the first noise component contained in the first reflected light beam component.

In Step 110, it is determined whether one field period has elapsed since the beginning of the sensing operation of the first noise component, i.e., whether a new vertical synchronizing signal S11 has been output. When one field period has passed, the process goes to Step 111 in which the signal charge S16 of the first noise component is output from the CCD 28. The signal charge S16 of the first noise component is then stored in the image memory 34 in Step 112.

In Steps 113 through 117, the sensing operation of the second reflected light beam component is performed. In Step 113, as shown in FIG. 7, a vertical synchronizing signal S21 is output, and a correction light beam control is started, so that a correction light beam S23 is intermittently output as a pulsed beam. The pulse shape of the correction light beam S23 is different from the distance measuring light beam S3. Namely, the pulse height (i.e., the intensity of light) is constant and the output period $T_S$ is the same as that of the distance measuring light beam S3. In Step 114, a sensing operation control of the CCD 28 is started, and thus an electric charge discharging signal S22 and an electric charge transfer signal S25 are alternately output.

In the sensing operation of the second reflected light beam component, the pulse of the correction light beam S23 is rectangular, and the output timings of the electric charge discharging signal S22 and the electric charge transfer signal S25, relative to the correction light beam S23, are the same as those of the electric charge discharging signal S2 and the electric charge transfer signal S5, relative to the distance measuring light beam S3, in the sensing operation of the first reflected light beam component. Namely, a second sensing period $T_U$ is started at the same time as period $T_S$ ends, for which the correction light beam S23 is output. Thus, the second sensing period $T_U$ is started at the extinction of the pulse of the correction light beam S23, and the length of the period $T_U$ is the same as that of the first sensing period. Therefore, similar to the sensing operation of the first reflected light beam component, only a part of the reflected light beam S24 (i.e., the second reflected light beam component) is sensed by the CCD 28. The signal charge S26 generated by the sensed light beam corresponds to the distance from the camera body 10 to the measurement subject and is transferred to the vertical transfer unit by the electric charge transfer signal S25, similar to the signal charge S6 sensed in the sensing operation of the first reflected light beam component.

In Step 115, it is determined whether one field period has elapsed since the beginning of the sensing operation of the second reflected light beam, i.e., whether a new vertical synchronizing signal S21 has been output. When one field period has passed, the process goes to Step 116 in which the signal charge S26 of the second reflected light beam is output from the CCD 28. The signal charge S26 is then stored in the image memory 34 in Step 117. Then, in Step 118, the correction light beam control is turned OFF, and thus the light emitting operation of the light emitting device 14 is stopped.

In Steps 119 through 122, the sensing operation of the second noise component is performed. In Step 119, as shown in FIG. 8, a vertical synchronizing signal S31 is output, and a sensing operation control of the CCD 28 is started. Namely, an electric charge discharging signal S32 and an electric charge transfer signal S35 are alternately output while the light emitting operation of the light emitting device 14 is not carried out. Although the length and timing of the electric charge accumulation period $T_U$ are the same as those of the sensing operation of the second reflected light beam component, which is shown in FIG. 7, the distance measuring light beam does not irradiate the measurement subject (reference S33), and thus there is no reflected light beam (reference S34). Therefore, although a signal charge of the second reflected light beam component is not generated, a signal charge S36 corresponding to a noise component, such as the ambient daylight, is generated in the CCD 28. Namely, the signal charge S36 corresponds to the second noise component contained in the second reflected light beam component.

In Step 120, it is determined whether one field period has elapsed since the beginning of the sensing operation of the second noise component, i.e., whether a new vertical synchronizing signal S31 has been output. When one field period has passed, the process goes to Step 121 in which the signal charge S36 of the second noise component is output from the CCD 28. The signal charge S36 is stored in the image memory 34 in Step 122.

Note that the output timings of the electric charge discharging signal S32 and the electric charge transfer signal S35 in the sensing operation of the second noise component are the same as those of the electric charge discharging signal S12 and the electric charge transfer signal S15 in the sensing operation of the first noise component, and thus the signal charge S36 of the second noise component can be deemed to be equal to the signal charge S16 of the first noise component. In this case, the sensing operation of the second noise component can be omitted.

The first and second reflected light beam components (the signal charges S6 and S26) contain the reflected light beam components, which depend upon the reflectance of the surface of the measurement subject, and the noise component, such as the ambient daylight. In Step 123, a calculation process of the distance measurement (D) data is performed using the first and second reflected light beam components and the first and second noise components, which are obtained in Steps 103 through 122. The D data is output in Step 124, and the sensing operation ends.

Conversely, when it is determined in Step 102 that the V mode is selected, the distance measuring light beam control is turned OFF in Step 125, and a normal photographing operation (i.e., CCD video control) using the CCD 28 is turned ON in Step 126. Then, the sensing operation ends.

Figure 10:
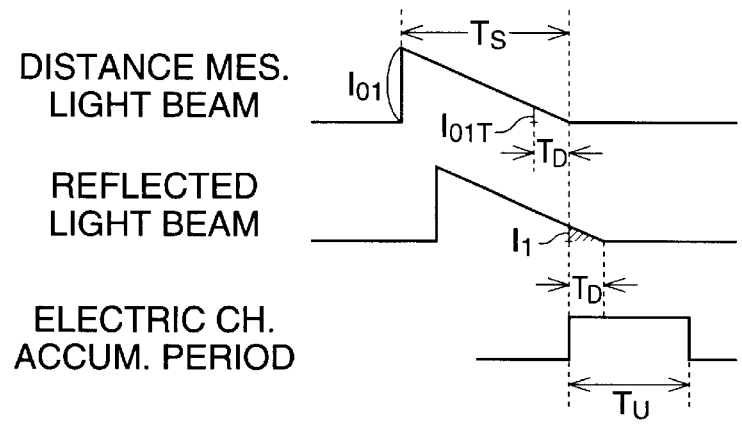
FIG. 10 is a view showing the timing of a distance measuring light beam, a reflected light beam and an electric charge accumulation period in the sensing operation of the first reflected light beam component.
Figure 11:
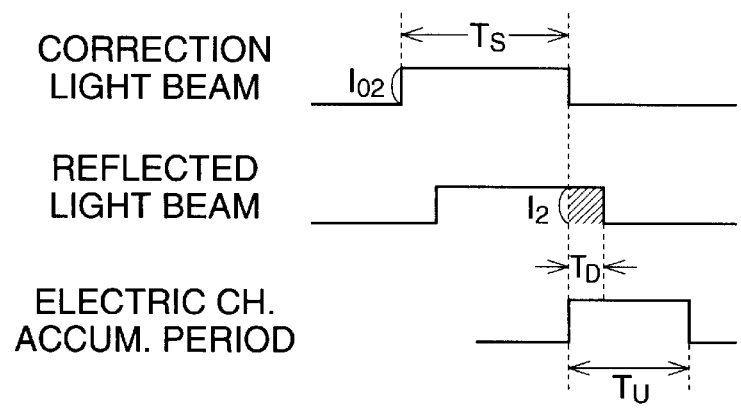
FIG. 11 is a view showing the timing of a correction light beam, a reflected light beam and an electric charge accumulation period in the sensing operation of the second reflected light beam component.

The contents of the calculations executed in Step 123 are described below with reference to FIGS. 10 and 11. FIG. 10 is a view, which shows a distance measuring light beam, a reflected light beam and an electric charge accumulation period in the sensing operation of the first reflected light beam component, which is shown in FIG. 5. FIG. 11 is a view, which shows a distance measuring light beam, a reflected light beam and an electric charge accumulation period in the sensing operation of the second reflected light beam component, which is shown in FIG. 7.

In the sensing operation of the first reflected light beam component, the electric charge accumulation period $T_u$ (the first sensing period) starts at the same time as the disappearance of a pulse of the distance measuring light beam, and ends after the disappearance of a pulse of the reflected light beam. Namely, a signal charge S6 (see FIG. 5), corresponding to a time $T_D$ immediately before the disappearance of the reflected light beam, is sensed. Here, when it is supposed that the initial intensity of the distance measuring light beam is $I_{01}$, the intensity $I_{01T}$ of the distance measuring light beam, which is at a point of the time $T_D$ before the disappearance of the distance measuring light beam, is:

$$I_{01T} = I_{01} \cdot (T_D/T_S) \qquad (1)$$

When it is supposed that the reflectance of the surface of the measurement subject is R and the diffusion coefficient of light is D(r), the intensity $I_1$ of the reflected light beam, which is at a point of the time $T_D$ before the disappearance of the reflected light beam, is:

$$I_1 = R \cdot D(r) \cdot I_{01T} \qquad (2)$$

Accordingly, the signal charge S6 or the output value (accumulated charge) of the CCD 28, which is generated by the reflected light beam for the time $T_D$, is $$S_1 = k \int_0^{T_D} I_1 dT = k \cdot R \cdot D(r) \cdot \frac{I_{01}}{T_s} \cdot \frac{1}{2} T_D^2 \qquad (3)$$

wherein k is constant.

On the other hand, in the sensing operation of the second reflected light beam component, the electric charge accumulation period $T_U$ (the second sensing period) starts at the same time as the disappearance of a pulse of the correction light beam, and ends after the disappearance of a pulse of the reflected light beam. Namely, similar to the sensing operation of the first reflected light beam component, a signal charge S26 (see FIG. 7), corresponding to a time $T_D$ immediately before the disappearance of the reflected light beam, is sensed. However, since the pulse shape of the correction light beam is rectangular, when it is supposed that the initial intensity of the correction light beam is $I_{02}$, the intensity $I_{02T}$ of the correction light beam, which is at a point of the time $T_D$ before the disappearance of the correction light beam, is:

$$I_{02T} = I_{02} \qquad (4)$$

The intensity $I_2$ of the reflected light beam, which is at a point of the time $T_D$ before the disappearance of the reflected light beam, is:

$$I_2 = R \cdot D(r) \cdot I_{02T} \qquad (5)$$

Accordingly, the signal charge S26 or the output value (accumulated charge) of the CCD 28, which is generated by the reflected light beam for the time $T_D$, is $$S_2 = k \int_0^{T_D} I_2 dT = k \cdot R \cdot D(r) \cdot I_{02} \cdot T_D \qquad (6)$$

A ratio of the output value $S_1$ of the first reflected light beam component to the output value $S_2$ of the second reflected light beam component, i.e., the accumulated electric charge ratio is obtained from the formulae (3) and (6) as follows:

$$S_D = S_1/S_2 = (\frac{1}{2}T_S) \cdot (I_{01}/I_{02}) \cdot T_D \qquad (7)$$

Here, when it is supposed that the distance from the camera to the measurement subject is "r" and the velocity of light is "C", the time $T_D$, which is required for the light radiated from the camera to return to the camera, is as follows:

$$T_D = 2r/C \qquad (8)$$

Accordingly, the distance r is expressed as following formula (9).

$$r = C \cdot T_s \cdot (I_{02}/I_{01}) \cdot S_D \qquad (9)$$

As understood from formulae (7), (8) and (9), the distance r does not contain the measurement subject, the reflectance R and the diffusion coefficient of light D(r).

On the other hand, the output values $S_1$ and $S_2$ contain accumulated electric charges corresponding to the first and second noise components. Therefore, in reality, the accumulated electric charge ratio $S_D$ is obtained by dividing a first value, which is obtained by removing an accumulated electric charge amount corresponding to the first noise component from the output value $S_1$, by a second value, which is obtained by removing an accumulated electric charge amount corresponding to the second noise component from the output value $S_2$.

Thus, in the calculation process of Step 123 of FIG. 9B, based on the first and second reflected light beam components, which are obtained in the sensing operations of the first and second reflected light beam components, and the first and second noise components, the distance r from the camera to each point of a surface of the measurement subject, i.e. a three-dimensional shape of the measurement subject is obtained according to formulae (3), (6) and (9).

The amount of the output values $S_1$ and $S_2$ of the first and second reflected light beam components and an output range of the CCD 28 (FIG. 2) are described below.

When a subject having a reflectance R is illuminated by a point light source positioned close to a forming optical system so that the subject is deemed as a secondary light source of a luminance $L_0$, and a subject image is formed on an image sensor by the forming optical system, if a flare component is neglected, illuminance Ea of the optical image is as follows:

$$E_a = (\tau \pi L_0 V \cdot \cos^4 \theta) / (4F^2(1+m)^2) \qquad (10)$$

wherein "τ" is transmittance of a lens of the forming optical system, "V" is vignetting factor, "θ" is an inclination angle of the subject relative to the optical axis, "F" is F-number of the forming optical system and "m" is lateral magnification of the forming optical system.

When it is supposed that the subject distance from the entrance pupil of the lens is "r", the focal length is "f", and a distance between the entrance pupil and the main axis is "vf" (v is a constant), the lateral magnification m is expressed as follows:

$$m = f/(r - f - vf)$$

If vf is neglected because vf has a minute value, formula (10) can be transformed as follows:

$$E_a = (\tau \pi L_0 V(r-f)^2 \cdot \cos^4 \theta) / (4F^2 r^2) \qquad (11)$$

On the other hand, if a point light source, having luminous intensity $I_{01} \cdot (T_D/T_S)$ (i.e., formula (1)), is positioned close to the entrance pupil and illuminates a subject, which is positioned away from the point light source by a distance $r_L$, illuminance $E_b$ of the subject is expressed as follows:

$$E_b = I_{01} \cdot (T_D/T_S) \cdot (\cos \alpha)/(r_L)^2 \qquad (12)$$

wherein "α" is an angle between the optical axis of the light source and a normal line on a surface of the subject. When it is supposed that a reflectance of the surface of the subject is "R" and the surface is a uniformly diffuse surface, a luminance $L_0$ of light, which occurs as the subject is illuminated to function as a secondary light source, is expressed as follows:

$$L_0 = R I_{01} \cdot (T_D/T_S) \cdot (\cos \alpha)/(\pi \cdot r_L^2) \qquad (13)$$

By substituting formula (13) for formula (11), the following relationship is obtained:

$$E_a = \frac{\tau RV(r-f)^2\cos^4\theta}{4F^2 r^2} \cdot \frac{I_{01}\cos\alpha}{r_L^2} \cdot \frac{T_D}{T_S} \quad (14)$$

The output value $S_1$, which is obtained by integrating the electric charge generated during the electric charge accumulation period $T_D$, is proportional to the exposure amount which is a product of the field illumination and the exposure period, and is obtained as follows:

$$S_1 = h_0 \int_0^{T_D} E_a \cdot dT \quad (15)$$

$$= \frac{h_0 \tau RV(r-f)^2\cos^4\theta}{4F^2 r^2} \cdot \frac{I_{01}\cos\alpha}{r_L^2} \cdot \frac{2r^2}{T_S C^2}$$

wherein $h_0$ is the constant of proportion of the equation for obtaining the exposure amount.

Formula (15) can be transformed to formula (16) when it is deemed that $r_L$ is nearly equal to r and the subject distance is much greater than the focal length.

$$S_1 \approx \frac{h_0 \tau RV \cos^4\theta}{4F^2} \cdot \frac{I_{01}\cos\alpha}{T_S C^2} \quad (16)$$

As understood from formula (16), the first reflected light beam component is approximately constant regardless of a change in the subject distance.

On the other hand, regarding the second reflected light beam component, the illuminance $E_b$ on the surface of the subject is expressed as follows:

$$E_b = I_{02} \cdot (\cos\alpha)/(r_L)^2 \quad (17)$$

Therefore, obtaining formula corresponding to formula (16) by using the method described above, in which formula (17) is used instead of formula (12), it is understood that the second reflected light beam component decreases in proportion to the inverse number of the subject distance.

Figure 12:
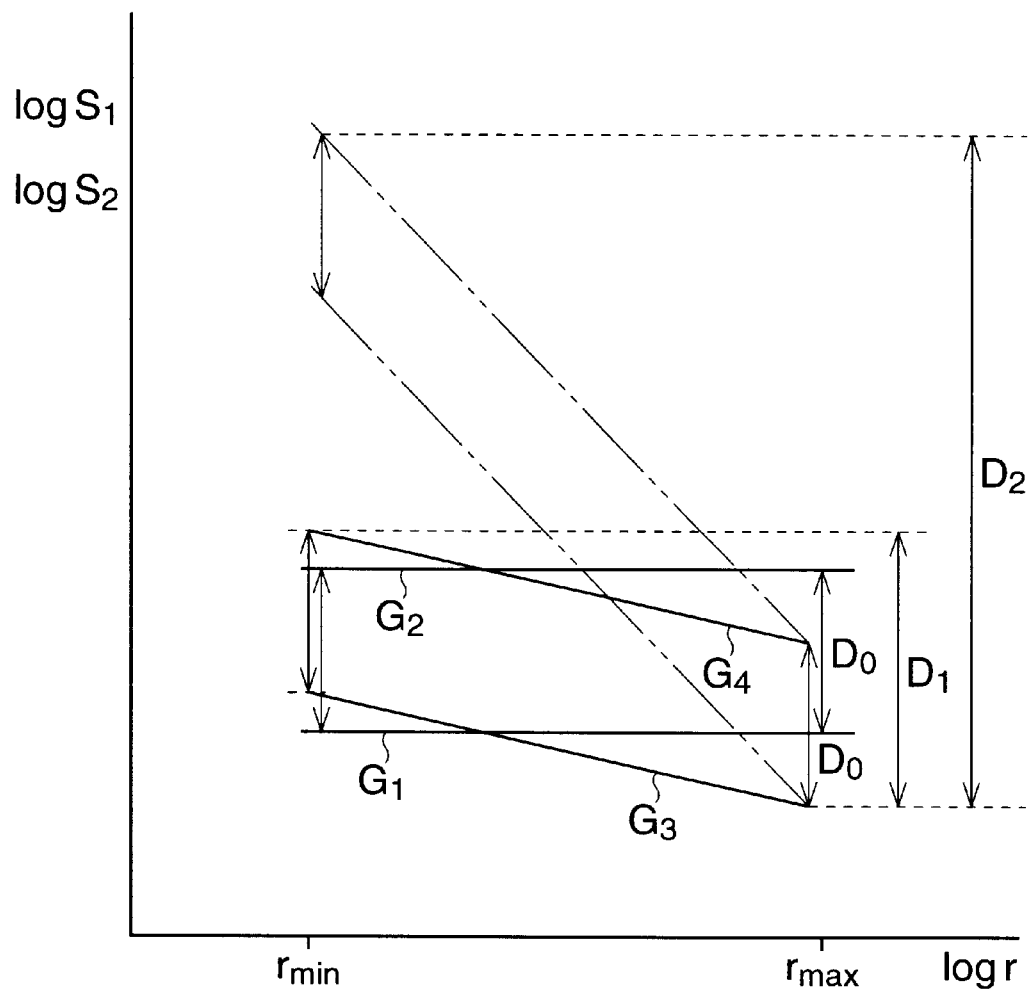
FIG. 12 is a view showing the relationship between an accumulated electric charge and an output range of a CCD.

FIG. 12 is a view showing a relationship between the accumulated electric charge amounts (the output values $S_1$ and $S_2$) and the output range of the CCD 28. The abscissa is the logarithm of the distance r, and the ordinate is the logarithm of the output values $S_1$ and $S_2$.

The output value $S_1$ of the first reflected light beam component is approximately constant, and the logarithm of the output value $S_1$ is varied in accordance with the breadth $D_0$ of the luminance of the measurement subject within a range sandwiched between the solid lines $G_1$ and $G_2$. Conversely, the output value $S_2$ of the second reflected light beam component is proportional to 1/r, and the logarithm of the output value $S_2$ is varied in accordance with the breadth $D_0$ of the luminance of the measurement subject within a range sandwiched between the solid lines $G_3$ and $G_4$.

Accordingly, for performing a distance measurement within a range between the minimum distance $r_{min}$ to the maximum distance $r_{max}$, the CCD 28 needs to have the output range shown by reference $D_1$. The breadth of the output range $D_1$ is greater than the breadth $D_0$ of the luminance of the measurement subject by 20 or 30% at most.

Conversely, as a method in which any influence of the reflectance of the measurement subject is corrected, the entire width of each of the pulses of the reflected light beam may be sensed, which is different from the embodiment (the specification of U.S. Ser. No. 09/343,392, for example). For example, all of the reflected light beam S24 may be sensed by starting the sensing period $T_U$ before the rise of the pulse S24 (see FIG. 7). However, according to this method, a term, which is in proportion to $1/r^2$ and included in the accumulated electric charge, becomes relatively large, and as a result it is necessary to expand the output range of the CCD 28 as shown by reference $D_2$.

As described above, in the embodiment, by calculating the ratio $S_D$ of the first reflected light beam component, obtained by the sensing operation of the reflected light beam component, to the second reflected light beam component, obtained by the sensing operation of the second reflected light beam component, the influence of the surface of the measurement subject is removed. Further, prior to the calculation of the ratio $S_D$, the corresponding noise components are removed from each of the first and second reflected light beam components. Therefore, correction of the noise, such as the reflectance, can be carried out with a simple calculation, and further, the output range of the imaging device is restrained as much as possible, so that the distance measurement accuracy of the three-dimensional shape of the measurement subject is improved.

Note that, although the height of each of the pulses of the distance measuring light beam linearly decreases in the embodiment, the height may linearly increase. Further, the variation of the pulse height may be non-linear.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2000-133504 (filed on May 2, 2000) which is expressly incorporated herein, by reference, in its entirety.

What is claimed is:

1. A three-dimensional image capturing device, comprising:

a distance measuring light beam irradiating processor that irradiates a distance measuring light beam to a measurement subject, said distance measuring light beam being a pulsed beam, the height of the pulse of said distance measuring light beam changing linearly with time, the measurement subject reflecting said distance measuring light beam to generate a first reflected light beam pulse;

a first reflected light beam component sensing processor that receives said first reflected light beam pulse for a first sensing period to sense a first reflected light beam component, the first sensing period starting at the extinction of the pulse of said distance measuring light beam;

a correction light beam irradiating processor that irradiates a correction light beam to the measurement subject, said correction light beam being a pulsed beam, the height of the pulse being constant, said measurement subject reflecting said correction light beam to generate a second reflected light beam pulse;

a second reflected light beam component sensing processor that receives said second reflected light beam pulse for a second sensing period to sense a second reflected light beam component, the second sensing period starting at the extinction of the pulse of said correction light beam; and a distance information calculating processor that divides said first reflected light beam component by said second reflected light beam component to obtain the distance from said device to each point of a surface of the measurement subject.

2. A device according to claim 1, wherein the height of the pulse of said distance measuring light beam linearly decreases.

3. A device according to claim 1, wherein the pulse of said distance measuring light beam is saw-toothed.

4. A three-dimensional image capturing device, comprising:

means for irradiating a distance measuring light beam to a measurement subject, said distance measuring light beam being a pulsed beam, the height of the pulse changing linearly with time, the measurement subject reflecting said distance measuring light beam to generate a first reflected light beam pulse;

means for receiving said first reflected light beam pulse for a first sensing period to sense a first reflected light beam component, the first sensing period starting at the extinction of the pulse of said distance measuring light beam;

means for irradiating a correction light beam to the measurement subject, said correction light beam being a pulsed beam, the height of the pulse being constant, the measurement subject reflecting said correction light beam to generate a second reflected light beam pulse;

means for receiving said second reflected light beam pulse for a second sensing period to sense a second reflected light beam component, the second sensing period starting at the extinction of the pulse of said correction light beam; and means for dividing said first reflected light beam component by said second reflected light beam component to obtain the distance from said device to each point of a surface of the measurement subject.

* * * * *